United States Patent
Li et al.

(10) Patent No.: US 12,425,933 B2
(45) Date of Patent: Sep. 23, 2025

(54) CELL RESELECTION TECHNIQUES USING A CELL LIST

(71) Applicant: ZTE Corporation, Guangdong (CN)

(72) Inventors: Wenting Li, Guangdong (CN); He Huang, Guangdong (CN); Yuan Gao, Guangdong (CN)

(73) Assignee: ZTE Corporation, Shenzhen (CN)

(*) Notice: Subject to any disclaimer, the term of this patent is extended or adjusted under 35 U.S.C. 154(b) by 454 days.

(21) Appl. No.: 17/880,201

(22) Filed: Aug. 3, 2022

(65) Prior Publication Data
US 2022/0386193 A1    Dec. 1, 2022

Related U.S. Application Data

(63) Continuation of application No. PCT/CN2020/075063, filed on Feb. 13, 2020.

(51) Int. Cl.
*H04W 36/00*   (2009.01)
*H04W 48/12*   (2009.01)

(52) U.S. Cl.
CPC ........ *H04W 36/0061* (2013.01); *H04W 48/12* (2013.01)

(58) Field of Classification Search
CPC ........................... H04W 36/0061; H04W 48/12
USPC ......................................................... 370/331
See application file for complete search history.

(56) References Cited

U.S. PATENT DOCUMENTS

| | | | |
|---|---|---|---|
| 2014/0194117 A1 | 7/2014 | Jeong et al. | |
| 2021/0092621 A1* | 3/2021 | Shih | H04W 48/20 |
| 2021/0099924 A1* | 4/2021 | Shih | H04W 36/0061 |
| 2021/0185596 A1* | 6/2021 | Assouline | H04W 24/10 |
| 2022/0256416 A1* | 8/2022 | Sharma | H04W 36/0061 |
| 2023/0037553 A1* | 2/2023 | Shih | H04W 36/13 |
| 2023/0345351 A1* | 10/2023 | Lindheimer | H04L 63/104 |

FOREIGN PATENT DOCUMENTS

| | | |
|---|---|---|
| CN | 101637048 A | 1/2010 |
| CN | 102088685 A | 6/2011 |
| CN | 104509166 A | 4/2015 |
| CN | 114731733 B | 7/2024 |
| WO | 2012047144 A1 | 4/2012 |

(Continued)

OTHER PUBLICATIONS

Samsung, "Cell Reselection remaining issues," 3GPP TSG RAN WG2 #108, Reno, USA, R2-1916225, 3 pages, Nov. 18-22, 2019.

(Continued)

*Primary Examiner* — Nicholas R Taylor
*Assistant Examiner* — Chong G Kim
(74) *Attorney, Agent, or Firm* — Perkins Coie LLP

(57) ABSTRACT

Techniques are described for cell reselection technology. An example wireless communication method comprises transmitting, by a network node, one or more black cell lists to a communication node, where each black cell list describes a range of physical cell identifiers (PCI) of one or more network nodes that are prevented from being used by the communication node for reselection, and where each black cell list is associated with one or more network identifiers (IDs) of the one or more network nodes or an indication of a type of network that indicates a type of service provided by one network node.

14 Claims, 11 Drawing Sheets

(56) References Cited

FOREIGN PATENT DOCUMENTS

WO    2019003059 A1    1/2019
WO    2019031216 A1    2/2019

OTHER PUBLICATIONS

Huawei et al., "Mobility support across carrier types," 3GPP TSG RAN WG1 #74, Barcelona, Spain, R1-132869, 4 pages, Aug. 19-23, 2013.
International Search Report and Written Opinion for International Application No. PCT/CN2020/075063, mailed on Nov. 25, 2020 (7 pages).
Office Action for Chinese Patent Application No. 202080082724.9, mailed Jul. 15, 2023 (11 pages).
Office Action for Chinese Patent Application No. 202080082724.9 mailed Apr. 1, 2024, with English Summary (8 pages).
Notification to Grant Patent Right for Invention for Chinese Patent Application No. 202080082724.9 mailed Jun. 24, 2024, with English Summary (2 page).
First Office Action from Mexican Patent Application No. MX/a/2022/010004 dated Aug. 11, 2025, with English summary, 4 pages.

\* cited by examiner

CELL RESELECTION TECHNIQUES USING A CELL LIST

CROSS REFERENCE TO RELATED APPLICATIONS

This patent document is a continuation of and claims benefit of priority to International Patent Application No. PCT/CN2020/075063, filed on Feb. 13, 2020. The entire content of the before-mentioned patent application is incorporated by reference as part of the disclosure of this application.

TECHNICAL FIELD

This disclosure is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

Techniques are disclosed for configuring and/or performing cell reselection.

A first example wireless communication method comprises, transmitting, by a network node, one or more black cell lists to a communication node, where each black cell list describes a range of physical cell identifiers (PCI) of one or more network nodes that are prevented from being used by the communication node for reselection, and where each black cell list is associated with one or more network identifiers (IDs) of the one or more network nodes or an indication of a type of network that indicates a type of service provided by one network node.

In some embodiments, the one or more black cell lists are transmitted in a system information block (SIB). In some embodiments, the one or more black cell lists are transmitted in a radio resource control (RRC) signaling. In some embodiments, the type of network includes a public network integrated non-public network (PNI-NPN), a stand-alone non-public network (SNPN), or a non-public network (NPN). In some embodiments, the one or more black cell lists are configured for intra frequency of the network node or for each inter-frequency of the network node.

A second wireless communication method comprises, transmitting, by a network node, one or more neighbor cell lists to a communication node, where each neighbor cell list describes one or more physical cell identifiers (PCIs) of one or more network nodes that are allowed to be utilized by the communication node for reselection, and where each neighbor cell list is associated with one or more network identifiers (IDs) of the one or more network nodes or an indication of a type of network that indicates a type of service provided by one network node.

In some embodiments, the one or more neighbor cell lists are transmitted in a system information block (SIB). In some embodiments, the one or more neighbor cell lists are transmitted in a radio resource control (RRC) signaling. In some embodiments, the type of network includes a public network integrated non-public network (PNI-NPN), a stand-alone non-public network (SNPN), or a non-public network (NPN). In some embodiments, the one or more neighbor cell lists are configured for intra frequency of the network node or for each inter-frequency of the network node.

A third wireless communication method comprises receiving, by a communication node from a network node, one or more black cell lists, where each black cell list describes a range of physical cell identifiers (PCI) of one or more network nodes that are prevented from being used by the communication node, and where each black cell list is associated with one or more network identifiers (IDs) of the one or more network nodes or an indication of a type of network that indicates a type of service provided by one network node, and performing a cell reselection process by using a black cell list from the one or more black cell list according to a rule in which an attribute of the black cell list matches an attribute of the network node to which the communication node is configured to communicate.

In some embodiments, the rule specifies that the black cell list is associated with a network ID attribute that is same as that of the network node to which the communication node is configured to communicate. In some embodiments, the rule specifies that the black cell list is associated with an indication of a type of network attribute that is same as that of the network node to which the communication node is configured to communicate. In some embodiments, the one or more black cell lists are received in a system information block (SIB). In some embodiments, the one or more black cell lists are received in a radio resource control (RRC) signaling. In some embodiments, the type of network includes a public network integrated non-public network (PNI-NPN), a stand-alone non-public network (SNPN), or a non-public network (NPN). In some embodiments, the one or more black cell lists are configured for intra frequency of the network node or for each inter-frequency of the network node.

A fourth wireless communication method comprises receiving, by a communication node from a network node, one or more neighbor cell lists, where each neighbor cell list describes one or more physical cell identifiers (PCIs) of one or more network nodes that are allowed to be utilized by the communication node, and where each neighbor cell list is associated with one or more network identifiers (IDs) of the one or more network nodes or an indication of a type of network that indicates a type of service provided by one network node, and performing a cell reselection process by using a neighbor cell list from the one or more neighbor cell list according to a rule in which an attribute of the neighbor cell list matches an attribute of the network node to which the communication node is configured to communicate.

In some embodiments, the rule specifies that the neighbor cell list is associated with a network ID attribute that is same as that of the network node to which the communication node is configured to communicate. In some embodiments, the rule specifies that the neighbor cell list is associated with an indication of a type of network attribute that is same as that of the network node to which the communication node is configured to communicate. In some embodiments, the one or more neighbor cell lists are received in a system information block (SIB). In some embodiments, the one or more neighbor cell lists are received in a radio resource control (RRC) signaling. In some embodiments, the type of network includes a public network integrated non-public network (PNI-NPN), a stand-alone non-public network (SNPN), or a non-public network (NPN). In some embodiments, the one or more neighbor cell lists are configured for intra frequency of the network node or for each inter-frequency of the network node.

In yet another exemplary aspect, the above-described methods are embodied in the form of processor-executable code and stored in a non-transitory computer-readable storage medium. The code included in the computer readable storage medium when executed by a processor, causes the processor to implement the methods described in this patent document.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

Figure 1:
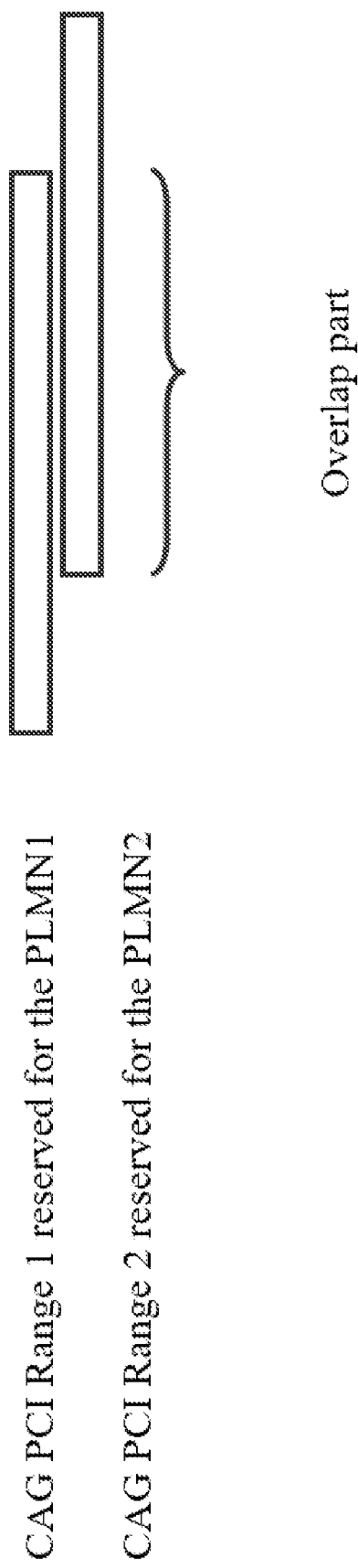
FIG. 1 shows an example scenario where a communication node may be confused between two different physical cell identifier (PCI) ranges reserved for two different public land mobile networks (PLMNs).

In the LTE and Release 15 (R15) of New Radio (NR), the black cell list and the neighbor cell list are set per cell instead of the per network identifier (ID). For example, in the NR, the System Information Block 1 (SIB1) as shown below may include different Public Land Mobile Network (PLMN) ID.

```
SIB1 ::= SEQUENCE {
   ....
   cellAccessRelatedInfo         CellAccessRelatedInfo,
}
CellAccessRelatedInfo ::=       SEQUENCE {
   plmn-IdentityList             PLMN-IdentityInfoList,
   cellReservedForOtherUse           ENUMERATED {true} OPTIONAL,          -- Need R
   ...
}
PLMN-IdentityInfoList ::=           SEQUENCE (SIZE (1..maxPLMN)) OF PLMN-IdentityInfo
PLMN-IdentityInfo ::=               SEQUENCE {
   plmn-IdentityList             SEQUENCE (SIZE (1..maxPLMN)) OF PLMN-Identity,
   trackingAreaCode              TrackingAreaCode OPTIONAL, -- Need R
   ranac             RAN-AreaCode          OPTIONAL, -- Need R
   cellIdentity              CellIdentity,
   cellReservedForOperatorUse        ENUMERATED {reserved, notReserved},
   ...
}
```

As shown below in bold italicized text, in the SIB3 which indicates the intra frequency cell re-selection, the IntraFreqNeighCellList and IntraFreqBlackCellList are not set per PLMN ID. Similarly, as shown below in bold italicized text, in the SIB4 which indicate the and inter frequency cell re-selection, the InterFreqNeighCellList and InterFreqBlackCellList are not set per PLMN ID. Two neighboring cells or two neighboring network nodes are considered to be intra-frequency neighbors if the two cells or network nodes share a same frequency for operation. Two neighboring cells or two neighboring network nodes are considered to be inter-frequency neighbors if the two cells or network nodes have different frequencies for operation.

SIB3 Information Element

```
-- ASN1START
-- TAG-SIB3-START
SIB3 ::=          SEQUENCE {
   intraFreqNeighCellList      IntraFreqNeighCellList      OPTIONAL, -- Need R
   intraFreqBlackCellList      IntraFreqBlackCellList      OPTIONAL, -- Need R
   lateNonCriticalExtension    OCTET STRING                OPTIONAL,
   ...
}
```

-continued

```
IntraFreqNeighCellList ::=   SEQUENCE(1..maxCellIntra)) OF IntraFreqNeighCellInfo
IntraFreqNeighCellInfo ::=       SEQUENCE {
  physCellId               PhysCellId,
  q-OffsetCell             Q-OffsetRange,
  q-RxLevMinOffsetCell          INTEGER (1..8)        OPTIONAL, --NeedR
  q-RxLevMinOffsetCellSUL       INTEGER (1..8)        OPTIONAL, --NeedR
  q-QualMinOffsetCell           INTEGER (1..8)        OPTIONAL, --NeedR
  ...
}
IntraFreqBlackCellList ::= SEQUENCE(SIZE (1..maxCellBlack)) OF PCI-Range
-- TAG-SIB3-STOP
-- ASN1STOP
```

SIB4 Information Element

```
-- ASN1START
-- TAG-SIB4-START
    SIB4 ::=            SEQUENCE {
      interFreqCarrierFreqList    InterFreqCarrierFreqList,
      lateNonCriticalExtension       OCTET STRING              OPTIONAL,
      ...
    }
InterFreqCarrierFreqList ::=   SEQUENCE (SIZE (1..maxFreq)) OF InterFreqCarrierFreqInfo
InterFreqCarrierFreqInfo ::=   SEQUENCE {
  ...
    interFreqNeighCellList        InterFreqNeighCellList    OPTIONAL, -- Need R
    interFreqBlackCellList        InterFreqBlackCellList    OPTIONAL, -- Need R
  ...
}
InterFreqNeighCellList ::= SEQUENCE (SIZE(1..maxCellInter)) OF InterFreqNeighCellInfo
InterFreqNeighCellInfo ::=       SEQUENCE {
  physCellId               PhysCellId,
  q-OffsetCell             Q-OffsetRange,
  q-RxLevMinOffsetCell          INTEGER (1..8)        OPTIONAL, --NeedR
  q-RxLevMinOffsetCellSUL       INTEGER (1..8)        OPTIONAL, --NeedR
  q-QualMinOffsetCell           INTEGER (1..8)        OPTIONAL, --NeedR
  ...
}
InterFreqBlackCellList ::= SEQUENCE (SIZE(1..maxCellBlack)) OF PCI-Range
-- TAG-SIB4-STOP
-- ASN1STOP
```

Thus, one of the technical problems with conventional technology is that the black cell list and white (or neighbor) cell list cannot be set per operator for the network sharing scenarios, which may lead intra or inter frequency cell reselection problem, especially for the public network and private network sharing scenario.

For the neighbor cell list, a cell specific Qoffset is provided. Qoffset describes a cell specific offset between two cells (or two network nodes) and can be used to prioritize one cell over another cell. One usage of the cell specific Qoffset in LTE is to prioritize some cells, such as closed subscriber group (CSG) cells. Similarly, the Qoffset can also be used to prioritize some closed access group (CAG) cells. But in the current system information, since the Normal UE and CAG UE may receive and refer to or use the same Neighbor cell list, the Normal UE may get the high rank for some CAG cells and read the corresponding SIB1 unnecessarily.

For the Black cell list, when the stand-alone non-public network (SNPN) or CAG was deployed on the mixed carrier, it impacted the legacy R15 UE re-selection mechanism where the R15 UE could not decode the physical cell identifier (PCI) range in Release 16 (R16) of NR so that the R15 UE had to read the SIM of the SNPN/CAG cell that has higher rank. To solve this problem, the PCI range of the CAG/SNPN UE may be included in the blacklist. But once the cell is shared by CAG and PLMN, it will cause misunderstanding for the R16 CAG UE if it refers to the same black list as shown in FIG. 1 and as further described below.

In such a scenario, if a cell is shared by the PLMN1 for the public service and PLMN2+CAG1 for the CAG service, the cell puts the PCI range 1 into the black cell list according to the proposal 1. The R15 UE that camps on the PLMN1 (or is connected to the RAN node via PLMN1) will ignore the PCI range 1 during the re-selection. However, for the CAG UE that camps on PLMN2+CAG1, the CAG UE can read the PCI range 2 but will find that part of the PCI range 2 is included in the blacklist, which will lead to confusion.

To overcome at least some of the described technical problems, this patent document describes example techniques to improve cell reselection technology. The example headings for the various sections below are used to facilitate the understanding of the disclosed subject matter and do not limit the scope of the claimed subject matter in any way. Accordingly, one or more features of one example section can be combined with one or more features of another example section. Furthermore, 5G terminology is used for the sake of clarity of explanation, but the techniques disclosed in the present document are not limited to 5G technology only, and may be used in wireless systems that implemented other protocols.

Example 1—Techniques for Transmitting a Black Cell List

Figure 2:
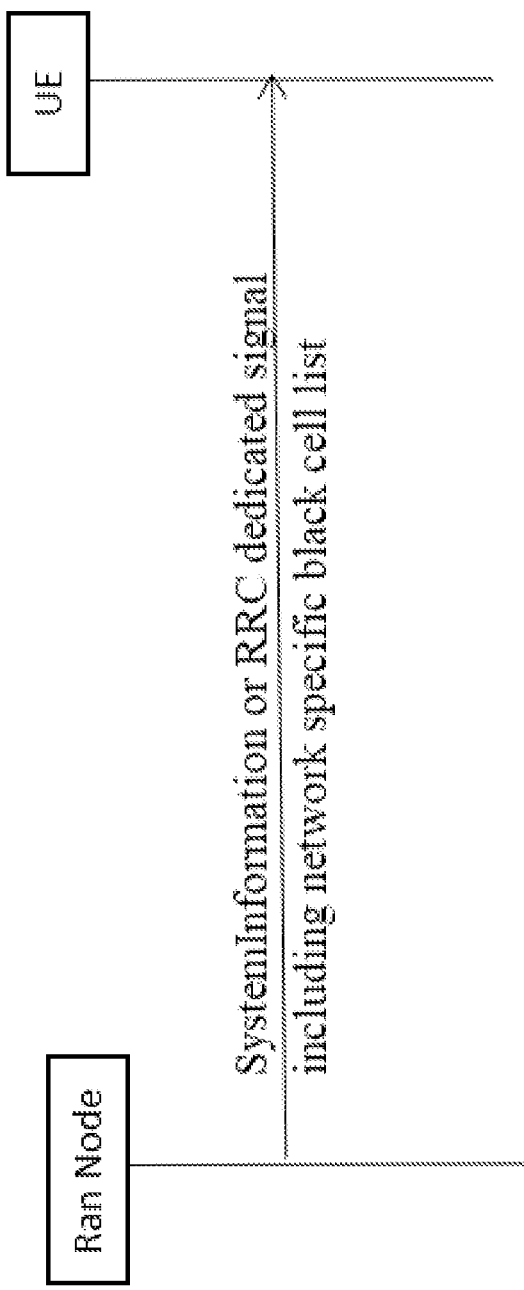
FIG. 2 shows transmission of a black cell list from a network node to a communication node.

In some embodiments, a network node may transmit a black cell list, where the black cell list can be configured or transmitted in the SIB or a dedicated radio resource control (RRC) signaling as shown in FIG. 2.

Example 2—Configuring the Black Cell List

In some embodiments, network node can configure and transmit a black cell list to include a type of network of one network node such that the type of network can describe a type of service provided by the one network node. A type of network can include a public network integrated non-public network (PNI-NPN) or a stand-alone non-public network (SNPN) or a non-public network (NPN). A user equipment (UE) can receive the black cell list and can, based on the network types and/or network IDs, use the neighbor cell list for cell reselection.

Example 2.1: The Black Cell List can be Configured for All of the NPN Network ID for the Intra Frequency A network node can transmit a intra frequency black cell lists to a UE using an SIB3 information element shown below, where the network node can include the IntraFreqBlackCellList-NPN in the black cell list (in bold italicized text), where the IntraFreqBlackCellList-NPN element can describe a list of blacklisted intra-frequency neighboring cells for a network node configured to provide a type of service as the NPN type of network.

*SIB3* Information element

```
-- ASN1START
-- TAG-SIB3-START
SIB3 ::=                        SEQUENCE {
   intraFreqNeighCellList        IntraFreqNeighCellList    OPTIONAL, --NeedR
   intraFreqBlackCellList        IntraFreqBlackCellList    OPTIONAL, --NeedR
   lateNonCriticalExtension      OCTET STRING              OPTIONAL,
   ...,
[[
*IntraFreqBlackCellList-NPN*  *Intra*FreqBlackCellList  OPTIONAL – Need R
]]
   }
   ...
   IntraFreqBlackCellList ::=    SEQUENCE (SIZE (1..maxCellBlack)) OF PCI-Range
-- TAG-SIB3-STOP
-- ASN1STOP
```

Figure 3:
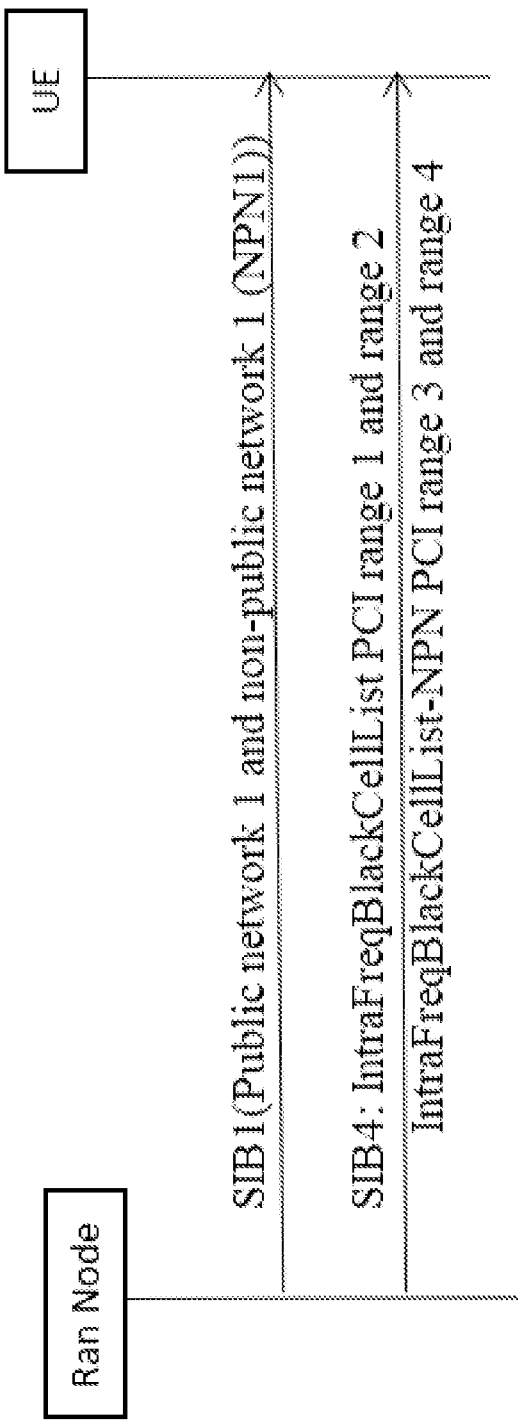
FIG. 3 shows an example transmission of multiple intra frequency black cell lists, where each intra frequency black cell list is associated with distinct type of network.

As shown in an example scenario in FIG. 3, a network node can transmit information about the public network 1 and NPN network 1 in SIB1. The network node can also transmit in the SIB3 a first black cell list that indicates that the legacy intraFreqBlackCellist includes PCI range 1 and range 2 and a second black cell list that indicates that the intraFreqBlackCellist-NPN includes PCI range 3 and range 4. The name of the first black cell list indicates that it is associated with an intra frequency for a first type of network that provides a public network type of service and the name of the second black cell list indicates that it is associated with an intra frequency a second type of network that provides NPN type of service. In this example scenario, after the UE receives the SIB1 and SIB3 information, if the UE is camped under the public network 1, it can exclude the PCI range 1 and range 2 from the candidate reselection list when the UE performs a cell reselection process. Also, in this example scenario, if the UE camped under the non public network (NPN) network 1, it can exclude the PCI range 3 and range 4 from the candidate reselection list when the UE performs the cell reselection process. In some embodiments, the network node that transmits a SIB can implicitly indicate to the UE a network identifier of the network node at least because the UE can determine that the UE is camped under, for example, public network 1 or NPN network 1 of the network node as described in Example 2.1.

Example 2.2: The Black Cell List can be Configured for all of the NPN for the Inter Frequency A network node can transmit inter frequency black cell lists to a UE using an SIB4 information element shown below, where the network node can include the InterFreqBlackCellList-NPN in the black cell list (in bold italicized text), where the InterFreqBlackCellList-NPN element can describe a list of blacklisted inter-frequency neighboring cells for the network node configured to provide a type of service as the NPN type of network.

SIB4 information element

```
-- ASN1START
-- TAG-SIB4-START
SIB4 ::=                  SEQUENCE {
    interFreqCarrierFreqList      InterFreqCarrierFreqList,
    lateNonCriticalExtension      OCTET STRING              OPTIONAL,
    ...
}
InterFreqCarrierFreqList ::=  SEQUENCE (SIZE (1..maxFreq)) OF InterFreqCarrierFreqInfo
InterFreqCarrierFreqInfo ::=  SEQUENCE {
...
    q-OffsetFreq          Q-OffsetRange             DEFAULT dB0,
    interFreqNeighCellList    InterFreqNeighCellList    OPTIONAL,  -- Need R
    interFreqBlackCellList    InterFreqBlackCellList    OPTIONAL,  -- Need R
    ...,
[[
interFreqBlackCellList-NPN   InterFreqBlackCellList   OPTIONAL – Need R
]]
}
InterFreqBlackCellList ::=    SEQUENCE (SIZE (1..maxCellBlack)) OF PCI-Range
-- TAG-SIB4-STOP
-- ASN1STOP
```

Figure 4:
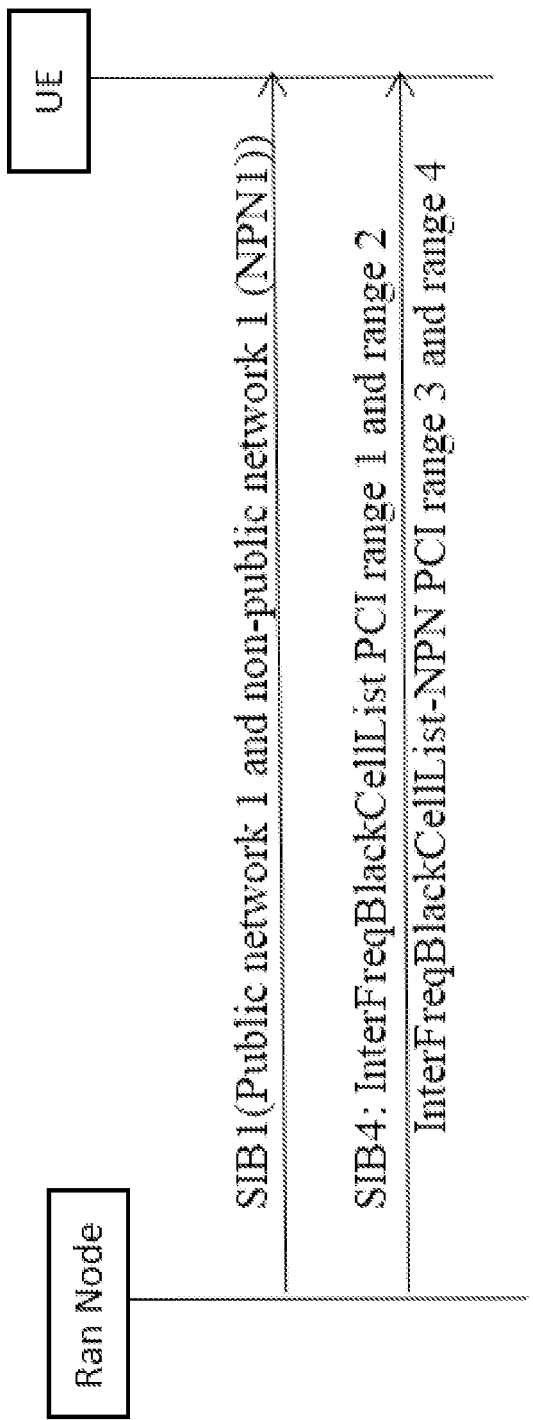
FIG. 4 shows an example transmission of multiple inter frequency black cell lists, where each inter frequency black cell list is associated with a type of network.

As shown in an example scenario in FIG. 4, a network node can transmit the public network 1 and NPN network 1 in the SIB1. The network node can also transmit in the SIB4, for a inter frequency, a first black cell list that indicates that the legacy interFreqBlackCellist includes PCI range 1 and range 2 and a second black cell list that indicates that the interFreqBlackCellist-NPN includes PCI range 3 and range 4. The name of the first black cell list indicates that it is associated with an inter frequency a first type of network that provides a public network type of service and the name of the second black cell list indicates that it is associated with an inter frequency a second type of network that provides NPN type of service. In this example scenario, after the UE receives the SIB1 and SIB3 information, if the UE is camped under the public network 1, it can exclude the PCI range 1 and range 2 from the candidate reselection list when the UE performs a cell reselection process. Also, in this example scenario, if the UE camped under the non-public network (NPN) network 1, it can exclude the PCI range 3 and range 4 from the candidate reselection list when the UE performs the cell reselection process. For one cell there may be more than one inter-frequency so each inter-frequency black cell list can be associated with a type of network.

Example 2.3: The Black Cell List can be Configured for the SNPN or CAG for the Intra Frequency A network node can transmit intra frequency black cell lists to a UE using an SIB3 information element shown below, where the network node can include the IntraFreqBlackCellList-SNPN in a first black cell list (in bold italicized text) and IntraFreqBlackCellList-CAG in a second black cell list (in bold italicized text), where the IntraFreqBlackCellList-SNPN and IntraFreqBlackCellList-CAG elements can respectively describe lists of blacklisted intra-frequency neighboring cells for a network node configured to provide a type of service as the SNPN type of network and/or CAG type of network.

SIB3 Information Element

```
-- ASN1START
-- TAG-SIB3-START
SIB3 ::=                  SEQUENCE {
    intraFreqNeighCellList    IntraFreqNeighCellList    OPTIONAL,  -- Need R
    intraFreqBlackCellList    IntraFreqBlackCellList    OPTIONAL,  -- Need R
    lateNonCriticalExtension  OCTET STRING              OPTIONAL,
    ...,
[[
    intraFreqBlackCellList-SNPN   IntraFreqBlackCellList  OPTIONAL – NeedR
    intraFreqBlackCellList-CAG    IntraFreqBlackCellList  OPTIONAL – NeedR
]]
}
...
```

```
IntraFreqBlackCellList ::=    SEQUENCE (SIZE (1..maxCellBlack)) OF PCI-Range
-- TAG-SIB3-STOP
-- ASN1STOP
```

Example 2.4: The Black Cell List can be Configured for the SNPN or CAG for the Inter Frequency A network node can transmit intra frequency black cell lists to a UE using an SIB3 information element shown below, where the network node can include the interFreqBlackCellList-SNPN in a first black cell list (in bold italicized text) and interFreqBlackCellList-CAG in a second black cell list (in bold italicized text), where the interFreqBlackCellList-SNPN and interFreqBlackCellList-CAG elements can respectively describe lists of blacklisted inter-frequency neighboring cells for a network node configured to provide a type of service as the SNPN type of network and/or CAG type of network.

SIB4 information element

```
-- ASN1START
-- TAG-SIB4-START
SIB4 ::=                    SEQUENCE {
   interFreqCarrierFreqList       InterFreqCarrierFreqList,
   lateNonCriticalExtension       OCTET STRING               OPTIONAL,
   ...
}
InterFreqCarrierFreqList: :=  SEQUENCE (SIZE (1..maxFreq)) OF InterFreqCarrierFreqInfo
InterFreqCarrierFreqInfo ::=  SEQUENCE {
...
   q-OffsetFreq           Q-OffsetRange                      DEFAULT dB0,
   interFreqNeighCellList    InterFreqNeighCellList          OPTIONAL,  -- NeedR
   interFreqBlackCellList    InterFreqBlackCellList          OPTIONAL,  -- NeedR
   ...,
[[
 interFreqBlackCellList-SNPN   InterFreqBlackCellList   OPTIONAL - - Need R
  interFreqBlackCellList-CAG    InterFreqBlackCellList   OPTIONAL - - Need R
]]
}
InterFreqBlackCellList ::=    SEQUENCE (SIZE (1..maxCellBlack)) OF PCI-Range
-- TAG-SIB4-STOP
-- ASN1STOP
```

Example 3—Configuring the Black Cell List to Include Network ID and/or Network Type

Example 3.1: The Black Cell List can be Configured for Cach Network ID for the Intra Frequency A network node can transmit an intra frequency black cell lists to a UE using an SIB3 information element shown below, where the network node can include the intraFreqBlackCellList-NPN in the black cell list (in bold italicized text), where the intraFreqBlackCellList-NPN element can describe a list of blacklisted intra-frequency neighboring cells for a network node configured to provide a type of service as the NPN type of network, and where the intraFreqBlackCellList-NPN element can describe networkIndex (in bold italicized text) that can indicate an index of a network ID according to the SIB1.

SIB3 Information Element

```
-- ASN1START
-- TAG-SIB3-START
SIB3 ::=              SEQUENCE {
   intraFreqNeighCellList    IntraFreqNeighCellList   OPTIONAL,  --NeedR
   intraFreqBlackCellList    IntraFreqBlackCellList   OPTIONAL,  --NeedR
   lateNonCriticalExtension  OCTET STRING             OPTIONAL,
   ...,
[[
 intraFreqBlackCellList-NPN   IntraFreqBlackCellList-NPN   OPTIONAL – Need R
]]
}
...
```

```
    IntraFreqBlackCellList ::=          SEQUENCE (SIZE (E.maxCellBlack)) OF PCI-Range
    IntraFreqBlackCellList-NPN ::=      SEQUENCE (SIZE (E.maxNPN)) OF     IntraFreqBlackCellList-NPN
    IntraFreqBlackCellList-NPN ::=      SEQUENCE {
       networkIndex    INTEGER(1..maxPLMN),
       intraFreqBlackCellList    IntraFreqBlackCellList
    }
    -- TAG-SIB3-STOP
    -- ASN1STOP
```

A UE can select a black cell list for cell reselection based on whether a network ID and/or a type of network indicated in the black cell list matches a network ID and/or type of network of the network node with which the UE is configured to communicate. In an example scenario, the SIB1 can indicate that the public network PLMN1 is associated with a NetworkIndex=0, and a NPN network SNPN1 is associated with a NetworkIndex=1, and a SNPN network SNPN2 is associated with NetworkIndex=2. In this example scenario, if in the SIB3, the legacy intraFreqBlackCellist includes PCI range 1 and range 2 while the intraFreqBlack-Cellist-NPN includes: PCI range 3 and range 4 for the SNPN1 NetworkIndex=1, and PCI range 5 and range 6 for the SNPN 2 NetworkIndex=2, then at UE side, for the UE camped under a network node providing the public network 1 (PLMN1), for the corresponding inter frequency, the UE can exclude the PCI range 1 and range 2 from the candidate reselection list, and for the UE camped under a network node providing the SNPN1, the UE can exclude the PCI range 3 and range 4 from the candidate reselection list, and for the UE camped under a network node providing the SNPN2, the UE can exclude the PCI range 5 and range 6 from the candidate reselection list.

An example SIB3 that indicates the PCI range for IntraFreqBlackCellList is shown below (in bold italicized text) and the network IDs black listed for IntraFreqBlack-CellList-NPN is also shown below (in bold italicized text).

*SIB3* Information Element

```
    -- ASN1START
    -- TAG-SIB3-START
    SIB3 ::=              SEQUENCE {
       intraFreqNeighCellList         IntraFreqNeighCellList       OPTIONAL,   -- Need R
       intraFreqBlackCellList         IntraFreqBlackCellList       OPTIONAL,   -- Need R
       lateNonCriticalExtension       OCTET STRING                 OPTIONAL,
       ...,
    [[
     intraFreqBlackCellList-SNPN    IntraFreqBlackCellList-NPN    OPTIONAL – Need R
     intraFreqBlackCellList-CAG     IntraFreqBlackCellList-NPN    OPTIONAL – Need R
    ]]
    }
    ...
    IntraFreqBlackCellList::=       SEQUENCE(SIZE(1..maxCellBlack)) OF PCI-Range
    IntraFreqBlackCellList-NPN::=   SEQUENCE(SIZE(1..maxNPN)) OF IntraFreqBlackCellList-NPN
    IntraFreqBlackCellList-NPN::=   SEQUENCE{
       networkIndex    INTEGER(1..maxPLMN),
       intraFreqBlackCellList    IntraFreqBlackCellList
    }
    -- TAG-SIB3-STOP
    -- ASN1STOP
```

Example 3.2: The Black Cell List can be Configured for the SNPN or CAG for the Inter Frequency A network node can transmit a inter frequency black cell lists to a UE using an SIB4 information element shown below, where the network node can include the interFreqBlackCellList-NPN in the black cell list (in bold italicized text), where the interFreqBlackCellList-NPN element can describe a list of blacklisted inter-frequency neighboring cells for a network node configured to provide a type of service as the NPN type of network, and where the interFreqBlackCellList-NPN element can describe networkIndex (in bold italicized text) that can indicate an index of a network ID according to the SIB1.

SIB4 Information Element

```
-- ASN1START
-- TAG-SIB4-START
SIB4 ::=                    SEQUENCE {
    interFreqCarrierFreqList    InterFreqCarrierFreqList,
    lateNonCriticalExtension    OCTET STRING            OPTIONAL,
    ...
}
InterFreqCarrierFreqList ::=    SEQUENCE (SIZE (1..maxFreq)) OF InterFreqCarrierFreqInfo
InterFreqCarrierFreqinfo ::=    SEQUENCE {
...
    q-OffsetFreq            Q-OffsetRange           DEFAULT dB0,
    interFreqNeighCellList  InterFreqNeighCellList  OPTIONAL,    -- Need R
    interFreqBlackCellList  InterFreqBlackCellList  OPTIONAL,    -- Need R
    ...,
[[
    interFreqBlackCellList     interFreqBlackCellListBlackCellList-NPN    OPTIONAL    -- Need R
]]
}
InterFreqBlackCellList ::=        SEQUENCE (SIZE (1..maxCellBlack)) OF PCI-Range
InterFreqBlackCellList-NPN ::=    SEQUENCE(SIZE (1..maxNPN)) OF InterFreqBlackCellList-NPN
InterFreqBlackCellList-NPN ::=    SEQUENCE {
    networkIndex            INTEGER (1..maxPLMN),
    interFreqBlackCellList  InterFreqBlackCellList
}
-- TAG-SIB4-STOP
-- ASN1STOP
```

In another example embodiment, a network node can transmit inter frequency black cell lists to a UE using an SIB4 information element shown below, where the network node can include the interFreqBlackCellList-SNPN in a first black cell list (in bold italicized text) and interFreqBlack-CellList-CAG in a second black cell list (in bold italicized text), where the interFreqBlackCellList-SNPN and inter-FreqBlackCellList-CAG elements can respectively describe lists of blacklisted inter-frequency neighboring cells for a network node configured to provide a type of service as the SNPN type of network and/or CAG type of network, and where the interFreqBlackCellList-NPN element can describe networkIndex (in bold italicized text) that can indicate an index of a network ID.

SIB4 Information Element

```
-- ASN1START
-- TAG-SIB4-START
SIB4 ::=                    SEQUENCE {
    interFreqCarrierFreqList    InterFreqCarrierFreqList,
    lateNonCriticalExtension    OCTET STRING            OPTIONAL,
    ...
}
InterFreqCarrierFreqList ::=    SEQUENCE (SIZE (1..maxFreq)) OF InterFreqCarrierFreqInfo
InterFreqCarrierFreqinfo ::=    SEQUENCE {
...
    q-OffsetFreq            Q-OffsetRange           DEFAULT dB0,
    interFreqNeighCellList  InterFreqNeighCellList  OPTIONAL,    -- Need R
    interFreqBlackCellList  InterFreqBlackCellList  OPTIONAL,    -- Need R
    ...,
[[
    interFreqBlackCellList-SNPN    InterFreqBlackCellList-NPN    OPTIONAL    -- Need R
    interFreqBlackCellList-CAG     InterFreqBlackCellList-NPN    OPTIONAL    -- Need R
]]
}
InterFreqBlackCellList ::=        SEQUENCE (SIZE (1..maxCellBlack)) OF PCI-Range
InterFreqBlackCellList-NPN ::=    SEQUENCE(SIZE (1..maxNPN)) OF InterFreqBlackCellList-NPN
InterFreqBlackCellList-NPN ::=    SEQUENCE {
    networkIndex            INTEGER (1..maxPLMN),
    interFreqBlackCellList  InterFreqBlackCellList
}
-- TAG-SIB4-STOP
-- ASN1STOP
```

Example 4—Techniques for Transmitting a Neighbor Cell List

Figure 5:
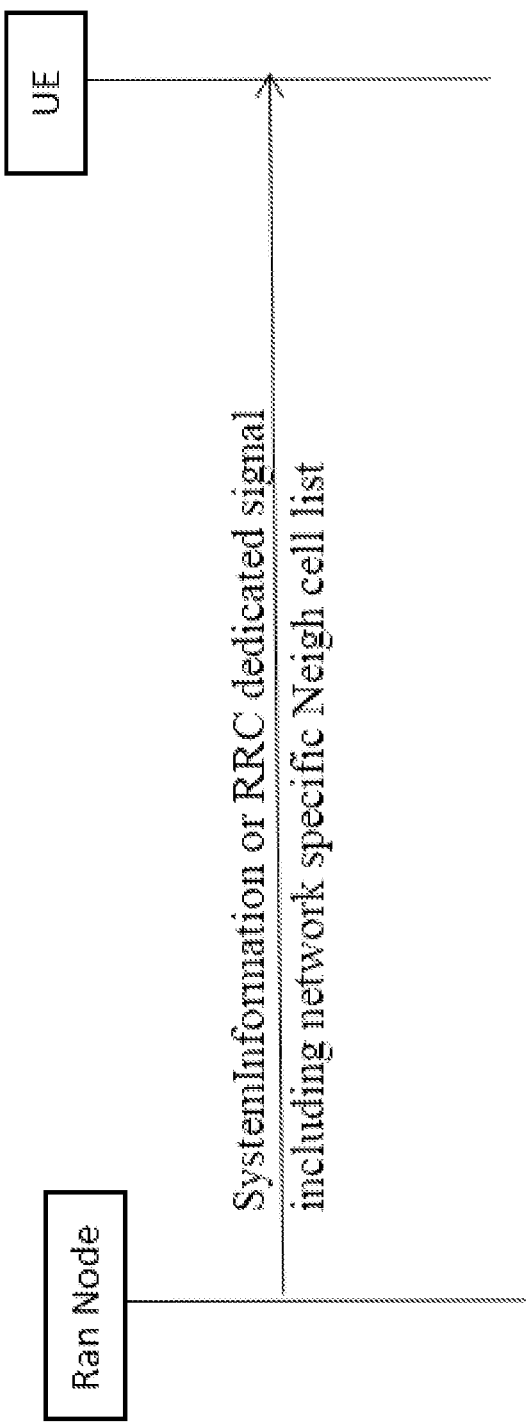
FIG. 5 shows transmission of a neighbor cell list from a network node to a communication node.

In some embodiments, a network node may transmit a neighbor cell list, where the neighbor cell list can be configured or transmitted in the SIB or a dedicated radio resource control (RRC) signaling as shown in FIG. 5.

Example 5: Configuring the Neighbor Cell List

In some embodiments, a network node can configure and transmit a neighbor cell list to include a type of network of one network node such that the type of network can describe a type of service provided by the one network node. A type of network can include a public network integrated non-public network (PNI-NPN) or a stand-alone non-public network (SNPN) or a non-public network (NPN). A user equipment (UE) can receive the neighbor cell list and can, based on the network types and/or network IDs, use the neighbor cell list for cell reselection.

Example 5.1: The Neighbor List is Configured for all of the NPN Letwork ID for the Intra Frequency A network node can transmit a intra frequency neighbor cell lists to a UE using an SIB3 information element shown below, where the network node can include the IntraFreq-NeighCellList-NPN in the neighbor cell list (in bold italicized text), where the IntraFreqNeighCellList-NPN element can describe a list of intra-frequency neighboring cells for the NPN for a network node configured to provide a type of service as the NPN type of network.

*SIB3* Information Element

```
-- ASN1START
-- TAG-SIB3-START
SIB3 ::=                    SEQUENCE {
    intraFreqNeighCellList      IntraFreqNeighCellList   OPTIONAL,  -- Need R
    intraFreqBlackCellList      IntraFreqBlackCellList   OPTIONAL,  -- Need R
    lateNonCriticalExtension    OCTET STRING             OPTIONAL,
    ...,
[[
intraFreqNeighCellList-NPN   IntraFreqNeighCellList OPTIONAL -- Need R
]]
}
...
IntraFreqNeighCellList ::= SEQUENCE (SIZE (1..maxCellIntra)) OF IntraFreqNeighCellInfo
IntraFreqNeighCellInfo ::=    SEQUENCE {
    physCellId              PhysCellId,
    q-OffsetCell            Q-OffsetRange,
    q-RxLevMinOffsetCell        INTEGER(1..8)        OPTIONAL,  --NeedR
    q-RxLevMinOffsetCellSUL     INTEGER(1..8)        OPTIONAL,  --NeedR
    q-QualMinOffsetCell         INTEGER (1..8)       OPTIONAL,  --NeedR
    ...
}
-- TAG-SIB3-STOP
-- ASN1STOP
```

Figure 6:
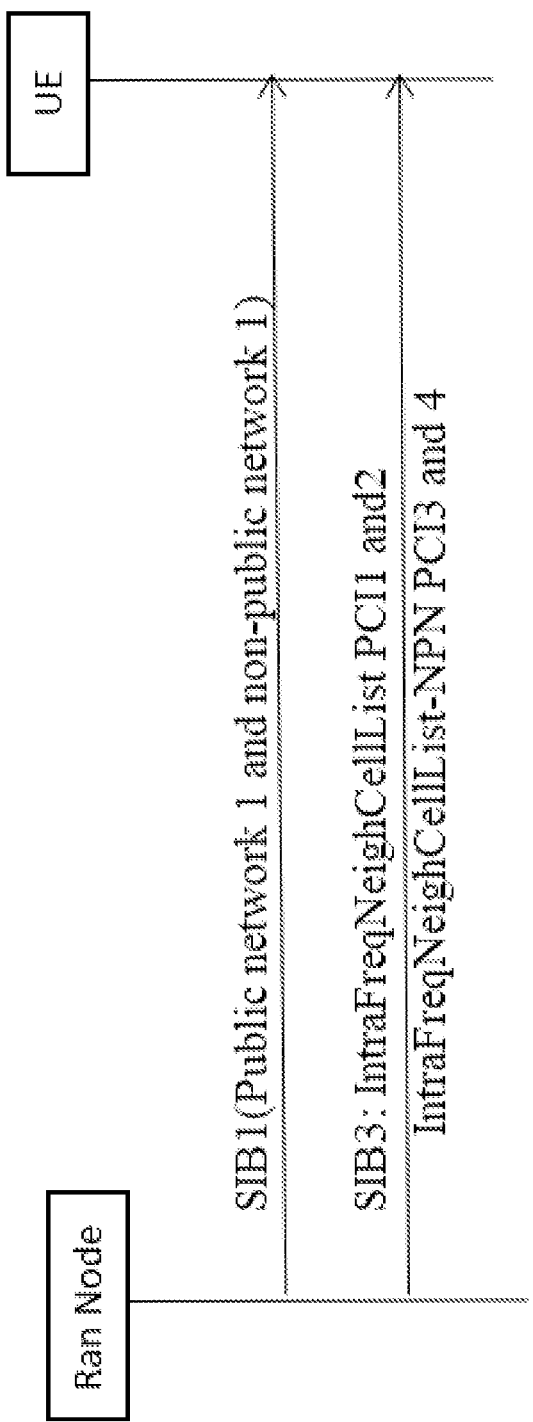
FIG. 6 shows an example transmission of multiple intra frequency neighbor cell lists, where each intra frequency neighbor cell list is associated with distinct type of network.

As shown in an example scenario in FIG. 6, a network node can transmit information about the public network 1 and NPN network 1 in the SIB1. The network node can also transmit in the SIB3 a first neighbor cell list that indicates that the legacy intraFreqNeighCellist includes PCI identifier 1 and PCI identifier 2 and a second neighbor cell list that indicates that the intraFreqNeighCellist-NPN includes PCI identifier 3 and PCI identifier 4. The name of the first neighbor cell list indicates that it is associated with an intra frequency for a first type of network that provides a public network type of service and the name of the second neighbor cell list indicates that it is associated with an intra frequency a second type of network that provides NPN type of service. In this example scenario, after the UE receives the SIB1 and SIB3 information, if the UE is camped under the public network 1, it can include the PCI identifier 1 and PCI identifier 2 into consideration when the UE performs a cell reselection process. Also, in this example scenario, if the UE camped under the non public network (NPN) network 1, it can include the PCI identifier 3 and PCI identifier 4 into consideration when the UE performs the cell reselection process. In some embodiments, each neighbor cell list describes one or more PCIs of one or more network nodes that are allowed to be utilized by the UE.

Example 5.2: The Neighbor List can be Configured for all of the NPN for the Inter Frequency A network node can transmit a inter frequency neighbor cell lists to a UE using an SIB4 information element shown below, where the network node can include the InterFreqNeighCellList-NPN in the neighbor cell list (in bold italicized text), where the InterFreqNeighCellList-NPN element can describe a list of inter-frequency neighboring cells for the NPN for a network node configured to provide a type of service as the NPN type of network.

*SIB4 information element*

```
-- ASN1START
-- TAG-SIB4-START
SIB4 ::=                    SEQUENCE {
   interFreqCarrierFreqList    InterFreqCarrierFreqList,
   lateNonCriticalExtension    OCTET STRING            OPTIONAL,
   ...
}

InterFreqCarrierFreqList: :=  SEQUENCE (SIZE (1..maxFreq)) OF InterFreqCarrierFreqInfo
InterFreqCarrierFreqinfo ::=  SEQUENCE {
...
   q-OffsetFreq             Q-OffsetRange           DEFAULT dB0,
   interFreqNeighCellList   InterFreqNeighCellList  OPTIONAL,  -- Need R
   interFreqBlackCellList   InterFreqBlackCellList  OPTIONAL,  -- Need R
   ...,
[[
interFreqNeighCellList-NPN  InterFreqNeighCellList  OPTIONAL - - Need R
]]
}
InterFreqNeighCellList ::= SEQUENCE(SIZE (1..maxCellInter)) OF InterFreqNeighCellInfo
InterFreqNeighCellInfo ::=  SEQUENCE {
   physCellId                 PhysCellId,
   q-OffsetCell               Q-OffsetRange,
   q-RxLevMinOffsetCell       INTEGER (1..8)    OPTIONAL,  --NeedR
   q-RxLevMinOffsetCellSUL    INTEGER(1..8)        OPTIONAL,  --NeedR
   q-QualMinOffsetCell        INTEGER (1..8)    OPTIONAL,  --NeedR
   ...
}
-- TAG-SIB4-STOP
-- ASN1STOP
```

Figure 7:
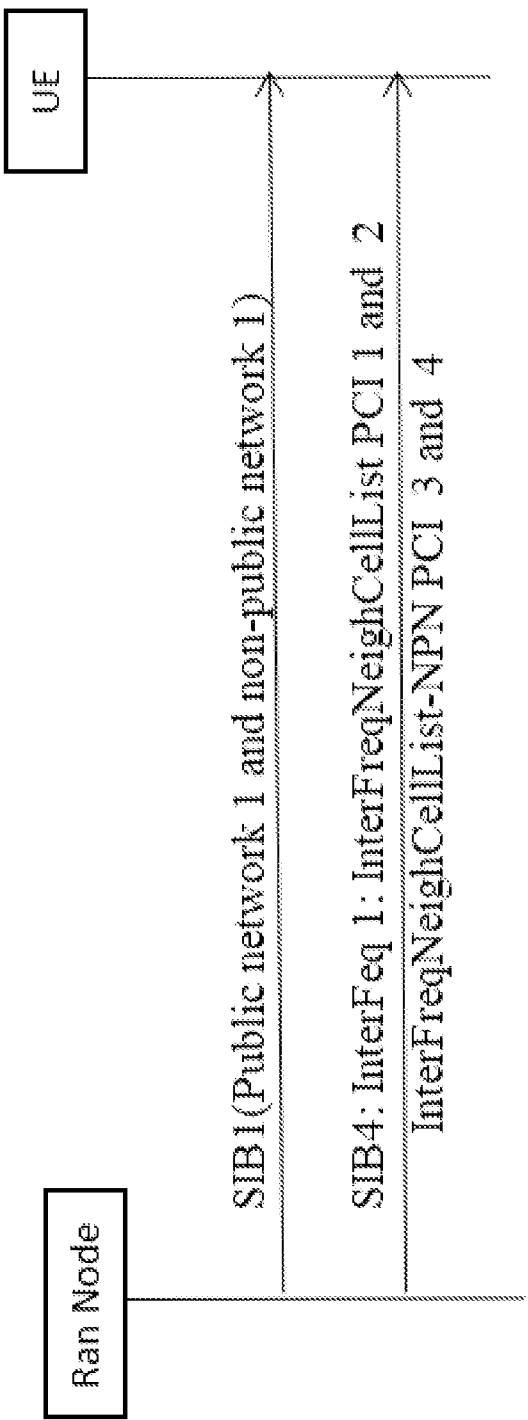
FIG. 7 shows an example transmission of multiple inter frequency neighbor cell lists, where each inter frequency neighbor cell list is associated with a type of network.

As shown in an example scenario in FIG. 7, a network node can transmit information about the public network 1 and NPN network 1 in the SIB1. The network node can also transmit in the SIB3 a first neighbor cell list that indicates that the legacy interFreqNeighCellist includes PCI identifier 1 and PCI identifier 2 and a second neighbor cell list that indicates that the interFreqNeighCellist-NPN includes PCI identifier 3 and PCI identifier 4. The name of the first neighbor cell list indicates that it is associated with an INT frequency for a first type of network that provides a public network type of service and the name of the second neighbor cell list indicates that it is associated with an inter frequency a second type of network that provides NPN type of service. In this example scenario, after the UE receives the SIB1 and SIB3 information, if the UE is camped under the public network 1, it can include the PCI identifier 1 and PCI identifier 2 into consideration when the UE performs a cell reselection process. Also, in this example scenario, if the UE camped under the non public network (NPN) network 1, it can include the PCI identifier 3 and PCI identifier 4 into consideration when the UE performs the cell reselection process. For one cell there may be more than one inter-frequency so each inter-frequency neighbor cell list can be associated with a type of network.

Example 5.3: The Neighbor List can be Configured for the SNPN or CAG for the Intra Frequency A network node can transmit intra frequency neighbor cell lists to a UE using an SIB3 information element shown below, where the network node can include the IntraFreqNeighCellList-SNPN in a first neighbor cell list (in bold italicized text) and IntraFreqNeighCellList-CAG in a second neighbor cell list (in bold italicized text), where the IntraFreqNeighCellList-SNPN and IntraFreqNeighCellList-CAG elements can respectively describe lists of intra-frequency neighboring cells for a network node configured to provide a type of service as the SNPN type of network and/or CAG type of network.

*SIB3* Information Element

```
-- ASN1START
-- TAG-SIB3-START
SIB3 ::=                    SEQUENCE {
   intraFreqNeighCellList      IntraFreqNeighCellList  OPTIONAL,  --NeedR
   intraFreqBlackCellList      IntraFreqBlackCellList  OPTIONAL,  --NeedR
   lateNonCriticalExtension    OCTET STRING            OPTIONAL,
   ...,
[[
intraFreqNeighCellList-SNPN   IntraFreqNeighCellList   OPTIONAL  -- Need R
intraFreqNeighCellList-CAG    IntraFreqNeighCellList   OPTIONAL  -- Need R
]]
}
...
```

```
IntraFreqNeighCellList ::=    SEQUENCE (SIZE (1..maxCellIntra)) OF IntraFreqNeighCellInfo
IntraFreqNeighCellInfo ::=    SEQUENCE {
    physCellId                PhysCellId,
    q-OffsetCell              Q-OffsetRange,
    q-RxLevMinOffsetCell      INTEGER (1..8)      OPTIONAL,   -- NeedR
    q-RxLevMinOffsetCellSUL   INTEGER (1..8)      OPTIONAL,   -- NeedR
    q-QualMinOffsetCell       INTEGER (1..8)      OPTIONAL,   -- NeedR
    ...
}
-- TAG-SIB3-STOP
-- ASN1STOP
```

Example 5.4: The Neighbor List can be Configured for the SNPN or CAG for the Inter Frequency A network node can transmit inter frequency neighbor cell lists to a UE using an SIB4 information element shown below, where the network node can include the InterFreqNeighCellList-SNPN in a first neighbor cell list (in bold italicized text) and InterFreqNeighCellList-CAG in a second neighbor cell list (in bold italicized text), where the InterFreqNeighCellList-SNPN and InterFreqNeighCellList-CAG elements can respectively describe lists of inter-frequency neighboring cells for a network node configured to provide a type of service as the SNPN type of network and/or CAG type of network.

*SIB4* Information Element

```
-- ASN1START
-- TAG-SIB4-START
SIB4 ::=                        SEQUENCE {
    interFreqCarrierFreqList        InterFreqCarrierFreqList,
    lateNonCriticalExtension        OCTET STRING        OPTIONAL,
    ...
}
InterFreqCarrierFreqList ::=    SEQUENCE (SIZE (1..maxFreq)) OF InterFreqCarrierFreqInfo
InterFreqCarrierFreqinfo ::=    SEQUENCE {
...
    q-OffsetFreq              Q-OffsetRange           DEFAULT dB0,
    interFreqNeighCellList    InterFreqNeighCellList  OPTIONAL,  --NeedR
    interFreqBlackCellList    InterFreqBlackCellList  OPTIONAL,  --NeedR
    ...,
[[
    *interFreqNeighCellList-SNPN*   *InterFreqNeighCellList*   *OPTIONAL -- Need R*
    *interFreqNeighCellList-CAG*    *InterFreqNeighCellList*   *OPTIONAL -- Need R*
]]
}
InterFreqNeighCellList ::=    SEQUENCE (SIZE (1..maxCellInter)) OF InterFreqNeighCellInfo
InterFreqNeighCellInfo ::=    SEQUENCE {
    physCellId                PhysCellId,
    q-OffsetCell              Q-OffsetRange,
    q-RxLevMinOffsetCell      INTEGER (1..8)      OPTIONAL,   --NeedR
    q-RxLevMinOffsetCellSUL   INTEGER (1..8)      OPTIONAL,   --NeedR
    q-QualMinOffsetCell       INTEGER (1..8)      OPTIONAL,   --NeedR
    ...
}
-- TAG-SIB4-STOP
-- ASN1STOP
```

Example 6: Configuring the Neighbor Cell List to Include Network ID and/or Network Type for Intra and Inter Frequencies Example 6.1: The Neighbor List can be Configured for Each Network ID for the Intra Frequency A network node can transmit a intra frequency neighbor cell lists to a UE using an SIB3 information element shown below, where the network node can include the intraFreqNeighCellList-NPN in the neighbor cell list (in bold italicized text), where the intraFreqNeighCellList-NPN element can describe a list of intra-frequency neighboring cells for a network node configured to provide a type of service as the NPN type of network, and where the intraFreqNeighCellList-NPN element can describe networkIndex (in bold italicized text) that can indicate an index of a network ID according to the SIB1. The techniques described in Example 3.1 for selection of black cell list can be used to select a neighbor cell list. Thus, a UE can select a neighbor cell list based on whether a network ID and/or a type of network indicated in the neighbor cell list matches a network ID and/or a type of network of the network node with which the UE is configured to communicate.

SIB3 Information Element

```
-- ASN1START
-- TAG-SIB3-START
SIB3 ::=                    SEQUENCE {
    intraFreqNeighCellList          IntraFreqNeighCellList      OPTIONAL,  --NeedR
    intraFreqBlackCellList          IntraFreqBlackCellList      OPTIONAL,  --NeedR
    lateNonCriticalExtension        OCTET STRING                OPTIONAL,
    ...,
[[
    intraFreqNeighCellList-NPN   IntraFreqNeighCellList-NPN  OPTIONAL – Need R
]]
}
...
IntraFreqNeighCellList ::= SEQUENCE (SIZE (1..maxCellIntra)) OF IntraFreqNeighCellInfo
IntraFreqNeighCellInfo ::=      SEQUENCE {
    physCellId                  PhysCellId,
    q-OffsetCell                Q-OffsetRange,
    q-RxLevMinOffsetCell        INTEGER (1..8)      OPTIONAL,  --NeedR
    q-RxLevMinOffsetCellSUL     INTEGER (1..8)      OPTIONAL,  --NeedR
    q-QualMinOffsetCell         INTEGER (1..8)      OPTIONAL,  --NeedR
    ...
}
IntraFreqNeighCellList-NPN ::=  SEQUENCE(SIZE(1..maxNPN)) OF IntraFreqNeighCellList-NPN
IntraFreqNeighCellList-NPN ::=  SEQUENCE{
    networkIndex    INTEGER(1..maxPLMN),
    intraFreqNeighCellList      IntraFreqNeighCellList
}
-- TAG-SIB3-STOP
-- ASN1STOP
```

An example SIB3 that indicates the PCI identifier(s) for IntraFreqNeighCellList is shown below (in bold italicized text) and the network IDs included in cell reselection for IntraFreqNeighCellList-NPN is also shown below (in bold italicized text).

SIB3 Information Element

```
-- ASN1START
-- TAG-SIB3-START
SIB3 ::=               SEQUENCE {
    intraFreqNeighCellList          IntraFreqNeighCellList      OPTIONAL,  --NeedR
    intraFreqBlackCellList          IntraFreqBlackCellList      OPTIONAL,  --NeedR
    lateNonCriticalExtension        OCTET STRING                OPTIONAL,
    ...,
[[
    intraFreqNeighCellList-SNPN   IntraFreqNeighCellList-NPN  OPTIONAL -- Need R
    intraFreqNeighCellList-CAG    IntraFreqNeighCellList-NPN  OPTIONAL -- Need R
]]
}
...
IntraFreqNeighCellList ::= SEQUENCE (SIZE (1..maxCellIntra)) OF IntraFreqNeighCellInfo
IntraFreqNeighCellInfo ::=      SEQUENCE {
    physCellId                  PhysCellId,
    q-OffsetCell                Q-OffsetRange,
    q-RxLevMinOffsetCell        INTEGER (1..8)      OPTIONAL,  --NeedR
    q-RxLevMinOffsetCellSUL     INTEGER (1..8)      OPTIONAL,  --NeedR
    q-QualMinOffsetCell         INTEGER (1..8)      OPTIONAL,  --NeedR
    ...
}
IntraFreqNeighCellList-NPN ::=  SEQUENCE (SIZE(1..maxNPN)) OF IntraFreqNeighCellList-NPN
IntraFreqNeighCellList-NPN ::=  SEQUENCE {
    networkIndex        INTEGER (1..maxPLMN),
    intraFreqNeighCellList IntraFreqNeighCellList
}
-- TAG-SIB3-STOP
-- ASN1STOP
```

Example 6.2: The Neighbor List can be Configured for the SNPN or CAG for the Inter Frequency A network node can transmit a inter frequency neighbor cell lists to a UE using an SIB4 information element shown below, where the network node can include the interFreqNeighCellList-NPN in the neighbor cell list (in bold italicized text), where the interFreqNeighCellList-NPN element can describe a list of inter-frequency neighboring cells for a network node configured to provide a type of service as the NPN type of network, and where the interFreqNeighCellList-NPN element can describe networkIndex (in bold italicized text) that can indicate an index of a network ID according to the SIB1.

*SIB4* Information Element

```
-- ASN1START
-- TAG-SIB4-START
SIB4 ::=           SEQUENCE {
   interFreqCarrierFreqList      InterFreqCarrierFreqList,
   lateNonCriticalExtension      OCTET STRING           OPTIONAL,
   ...
}
InterFreqCarrierFreqList ::=   SEQUENCE (SIZE (1..maxFreq)) OF InterFreqCarrierFreqInfo
InterFreqCarrierFreqinfo ::=   SEQUENCE {
...
   q-OffsetFreq              Q-OffsetRange              DEFAULT dB0,
   interFreqNeighCellList    InterFreqNeighCellList     OPTIONAL,  -- Need R
   interFreqBlackCellList    InterFreqBlackCellList     OPTIONAL,  -- Need R
   ...,
[[
 *interFreqNeighCellList-NPN InterFreqNeighCellList-NPN OPTIONAL  -- Need R*
]]
}
InterFreqNeighCellList ::=   SEQUENCE (SIZE (1..maxCellInter)) OF InterFreqNeighCellInfo
InterFreqNeighCellInfo ::=   SEQUENCE {
   physCellId              PhysCellId,
   q-OffsetCell            Q-OffsetRange,
   q-RxLevMinOffsetCell       INTEGER (1..8)     OPTIONAL,  --NeedR
   q-RxLevMinOffsetCellSUL    INTEGER(1..8)      OPTIONAL,  --NeedR
   q-QualMinOffsetCell        INTEGER (1..8)     OPTIONAL,  --NeedR
   ...
}
 *InterFreqNeighCellList-NPN ::=SEQUENCE (SIZE (1..maxNPN) OF InterFreqNeighCellList-NPN*
 *InterFreqNeighCellList-NPN::=   SEQUENCE {*
    *networkIndex           INTEGER (1..maxPLMN),*
    interFreqNeighCellList    InterFreqNeighCellList
}
-- TAG-SIB4-STOP
-- ASN1STOP
```

In another example embodiment, a network node can transmit inter frequency neighbor cell lists to a UE using an SIB4 information element shown below, where the network node can include the interFreqNeighCellList-SNPN in a first neighbor cell list (in bold italicized text) and interFreqNeighCellList-CAG in a second neighbor cell list (in bold italicized text), where the interFreqNeighCellList-SNPN and interFreqNeighCellList-CAG elements can respectively describe lists of inter-frequency neighboring cells for a network node configured to provide a type of service as the SNPN type of network and/or CAG type of network, and where the interFreqNeighCellList-NPN element can describe networkIndex (in bold italicized text) that can indicate an index of a network ID according to SIB1.

*SIB4* Information Element

```
-- ASN1START
-- TAG-SIB4-START
SIB4 ::=           SEQUENCE {
   interFreqCarrierFreqList      InterFreqCarrierFreqList,
   lateNonCriticalExtension      OCTET STRING           OPTIONAL,
   ...
}
InterFreqCarrierFreqList ::=   SEQUENCE (SIZE (1..maxFreq)) OF InterFreqCarrierFreqInfo
InterFreqCarrierFreqinfo ::=   SEQUENCE {
...
   q-OffsetFreq              Q-OffsetRange              DEFAULT dB0,
   interFreqNeighCellList    InterFreqNeighCellList     OPTIONAL, -- Need R
   interFreqBlackCellList    InterFreqBlackCellList     OPTIONAL, -- Need R
   ...,
```

```
[[
  interFreqNeighCellList-SNPN    InterFreqNeighCellList-NPN    OPTIONAL  -- Need R
  interFreqNeighCellList-CAG     InterFreqNeighCellList-NPN    OPTIONAL  -- Need R
]]
  }
  InterFreqNeighCellList ::=     SEQUENCE (SIZE (1..maxCellInter)) OF InterFreqNeighCellInfo
  InterFreqNeighCellInfo ::=     SEQUENCE {
    physCellId              PhysCellId,
    q-OffsetCell            Q-OffsetRange,
    q-RxLevMinOffsetCell    INTEGER (1..8)    OPTIONAL,  --NeedR
    q-RxLevMinOffsetCellSUL INTEGER(1..8)     OPTIONAL,  --NeedR
    q-QualMinOffsetCell     INTEGER (1..8)    OPTIONAL,  --NeedR
    ...
  }
  InterFreqNeighCellList-NPN ::= SEQUENCE(SIZE (1..maxNPN)) OF InterFreqNeighCellList-NPN
  InterFreqNeighCellList-NPN ::= SEQUENCE {
    networkIndex            INTEGER (1..maxPLMN),
    interFreqNeighCellList  InterFreqNeighCellList
  }
  -- TAG-SIB4-STOP
  -- ASN1STOP
```

Figure 8:
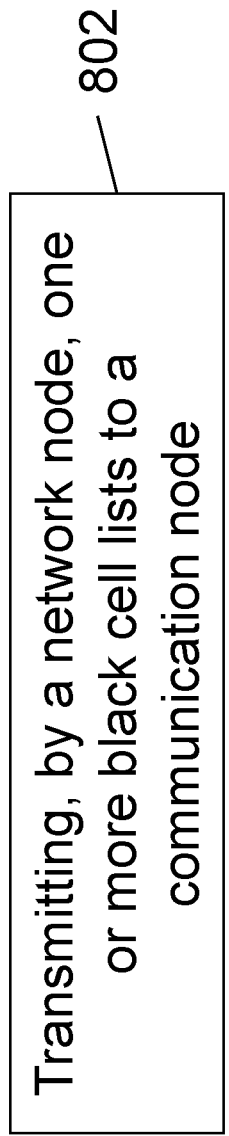
FIG. 8 shows an example flowchart for transmitting one or more black cell lists to a communication node.

FIG. 8 shows an example flowchart for transmitting one or more black cell lists to a communication node. At operation 802, the network node transmits one or more black cell lists to a communication node, where each black cell list describes a range of physical cell identifiers (PCI) of one or more network nodes that are prevented from being used by the communication node for reselection, and where each black cell list is associated with one or more network identifiers (IDs) of the one or more network nodes or an indication of a type of network that indicates a type of service provided by one network node. In some embodiments, the network node can generate and transmit the one or more black cell lists having features described in this patent document.

In some embodiments, the one or more black cell lists are transmitted in a system information block (SIB). In some embodiments, the one or more black cell lists are transmitted in a radio resource control (RRC) signaling. In some embodiments, the type of network includes a public network integrated non-public network (PNI-NPN), a stand-alone non-public network (SNPN), or a non-public network (NPN). In some embodiments, the one or more black cell lists are configured for intra frequency of the network node or for each inter-frequency of the network node.

Figure 9:
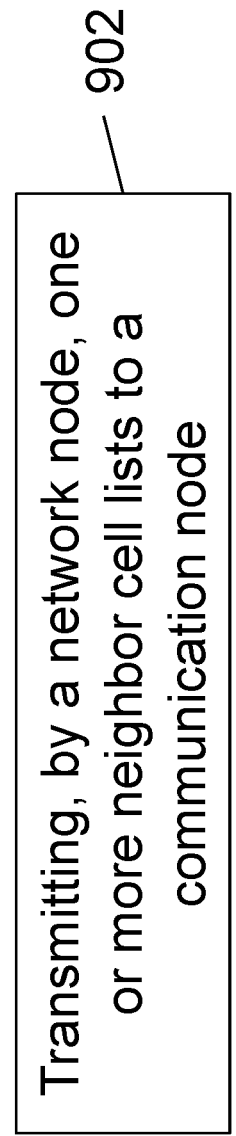
FIG. 9 shows an example flowchart for transmitting one or more neighbor cell lists to a communication node.

FIG. 9 shows an example flowchart for transmitting one or more neighbor cell lists to a communication node. At operation 902, the network node transmits one or more neighbor cell lists to a communication node, where each neighbor cell list describes one or more physical cell identifiers (PCIs) of one or more network nodes that are allowed to be utilized by the communication node for reselection, and where each neighbor cell list is associated with one or more network identifiers (IDs) of the one or more network nodes or an indication of a type of network that indicates a type of service provided by one network node. In some embodiments, the network node can generate and transmit the one or more neighbor cell lists having features described in this patent document.

In some embodiments, the one or more neighbor cell lists are transmitted in a system information block (SIB). In some embodiments, the one or more neighbor cell lists are transmitted in a radio resource control (RRC) signaling. In some embodiments, the type of network includes a public network integrated non-public network (PNI-NPN), a stand-alone non-public network (SNPN), or a non-public network (NPN). In some embodiments, the one or more neighbor cell lists are configured for intra frequency of the network node or for each inter-frequency of the network node.

Figure 10:
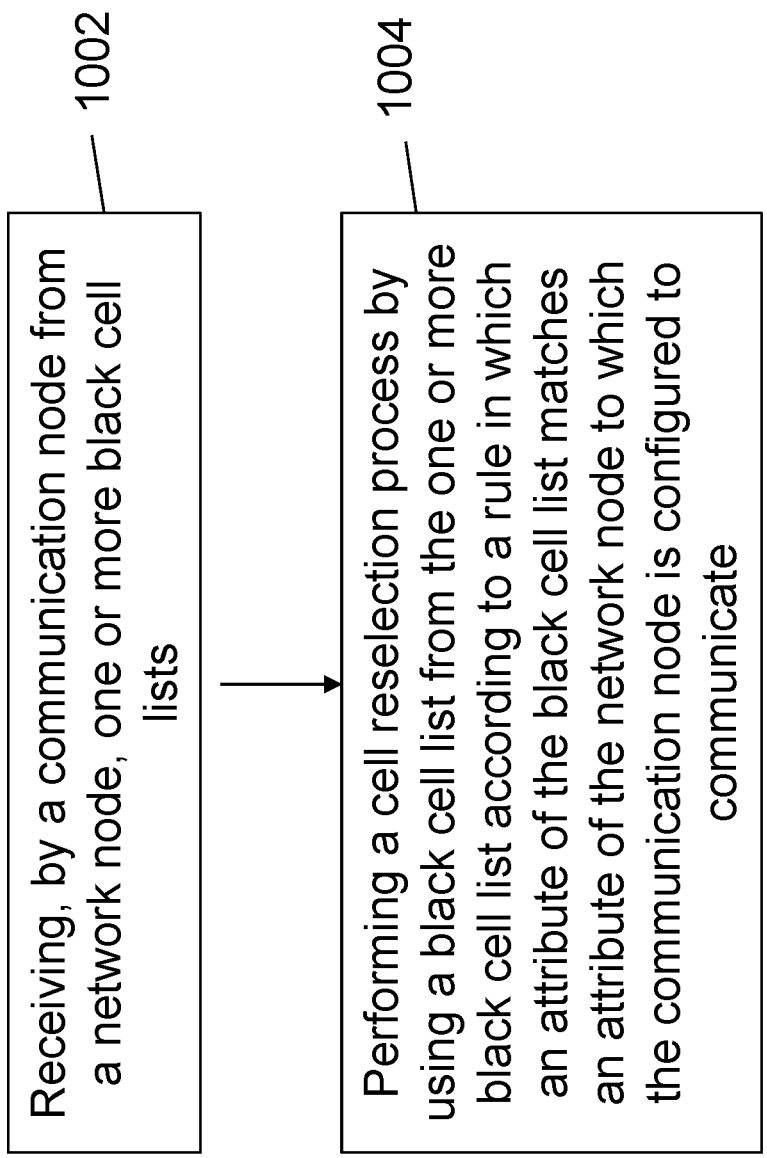
FIG. 10 shows an example flowchart for receiving and processing one or more black cell lists by a communication node.

FIG. 10 shows an example flowchart for receiving and processing one or more black cell lists by a communication node. At operation 1002, the communication node (e.g., UE) receives one or more black cell lists from a network node, where each black cell list describes a range of physical cell identifiers (PCI) of one or more network nodes that are prevented from being used by the communication node, and where each black cell list is associated with one or more network identifiers (IDs) of the one or more network nodes or an indication of a type of network that indicates a type of service provided by one network node. At operation 1004, the communication node performs a cell reselection process by using a black cell list from the one or more black cell list according to a rule in which an attribute of the black cell list matches an attribute of the network node to which the communication node is configured to communicate.

In some embodiments, the rule specifies that the black cell list is associated with a network ID attribute that is same as that of the network node to which the communication node is configured to communicate. In some embodiments, the rule specifies that the black cell list is associated with an indication of a type of network attribute that is same as that of the network node to which the communication node is configured to communicate. In some embodiments, the one or more black cell lists are received in a system information block (SIB). In some embodiments, the one or more black cell lists are received in a radio resource control (RRC) signaling. In some embodiments, the type of network includes a public network integrated non-public network (PNI-NPN), a stand-alone non-public network (SNPN), or a non-public network (NPN). In some embodiments, the one or more black cell lists are configured for intra frequency of the network node or for each inter-frequency of the network node.

Figure 11:
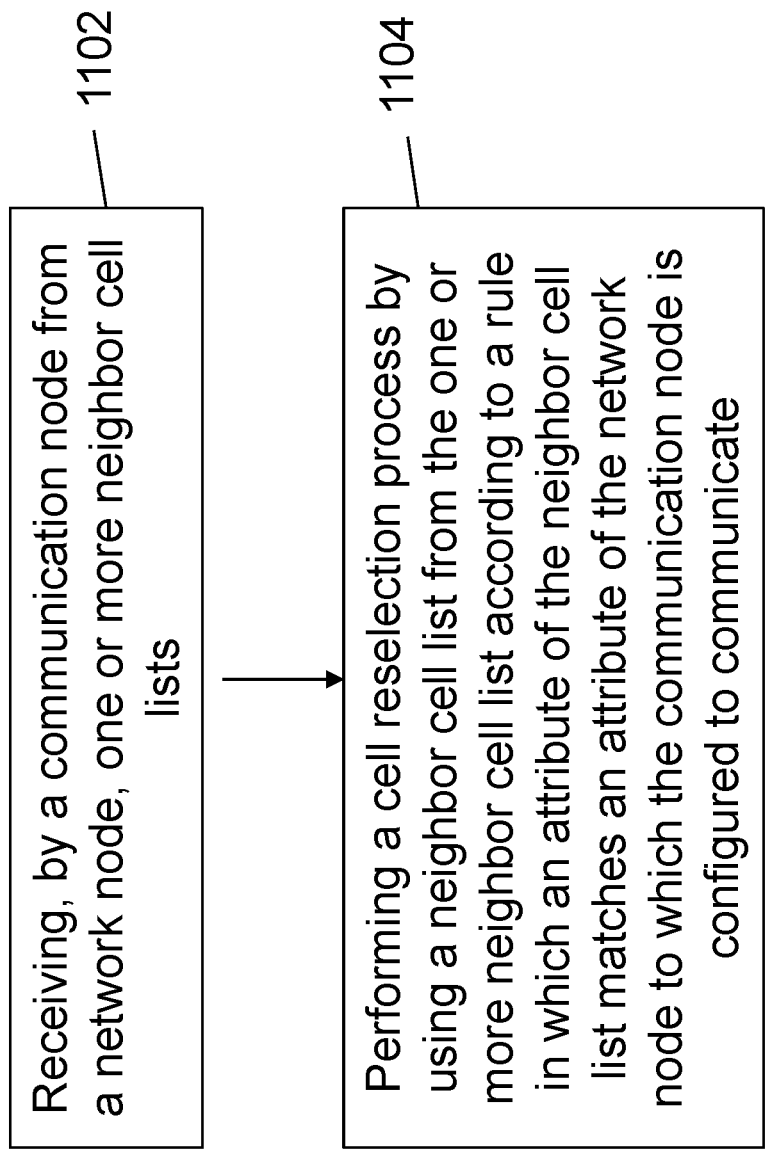
FIG. 11 shows an example flowchart for receiving and processing one or more neighbor cell lists by a communication node.

FIG. 11 shows an example flowchart for receiving and processing one or more neighbor cell lists by a communication node. At operation 1102, a communication node receives one or more neighbor cell lists from a network node, where each neighbor cell list describes one or more physical cell identifiers (PCIs) of one or more network nodes that are allowed to be utilized by the communication node, and where each neighbor cell list is associated with one or more network identifiers (IDs) of the one or more network nodes or an indication of a type of network that indicates a type of service provided by one network node. At operation 1104, the communication node performs a cell reselection process by using a neighbor cell list from the one or more neighbor cell list according to a rule in which an attribute of the neighbor cell list matches an attribute of the network node to which the communication node is configured to communicate.

In some embodiments, the rule specifies that the neighbor cell list is associated with a network ID attribute that is same as that of the network node to which the communication node is configured to communicate. In some embodiments, the rule specifies that the neighbor cell list is associated with an indication of a type of network attribute that is same as that of the network node to which the communication node is configured to communicate. In some embodiments, the one or more neighbor cell lists are received in a system information block (SIB). In some embodiments, the one or more neighbor cell lists are received in a radio resource control (RRC) signaling. In some embodiments, the type of network includes a public network integrated non-public network (PNI-NPN), a stand-alone non-public network (SNPN), or a non-public network (NPN). In some embodiments, the one or more neighbor cell lists are configured for intra frequency of the network node or for each inter-frequency of the network node.

Figure 12:
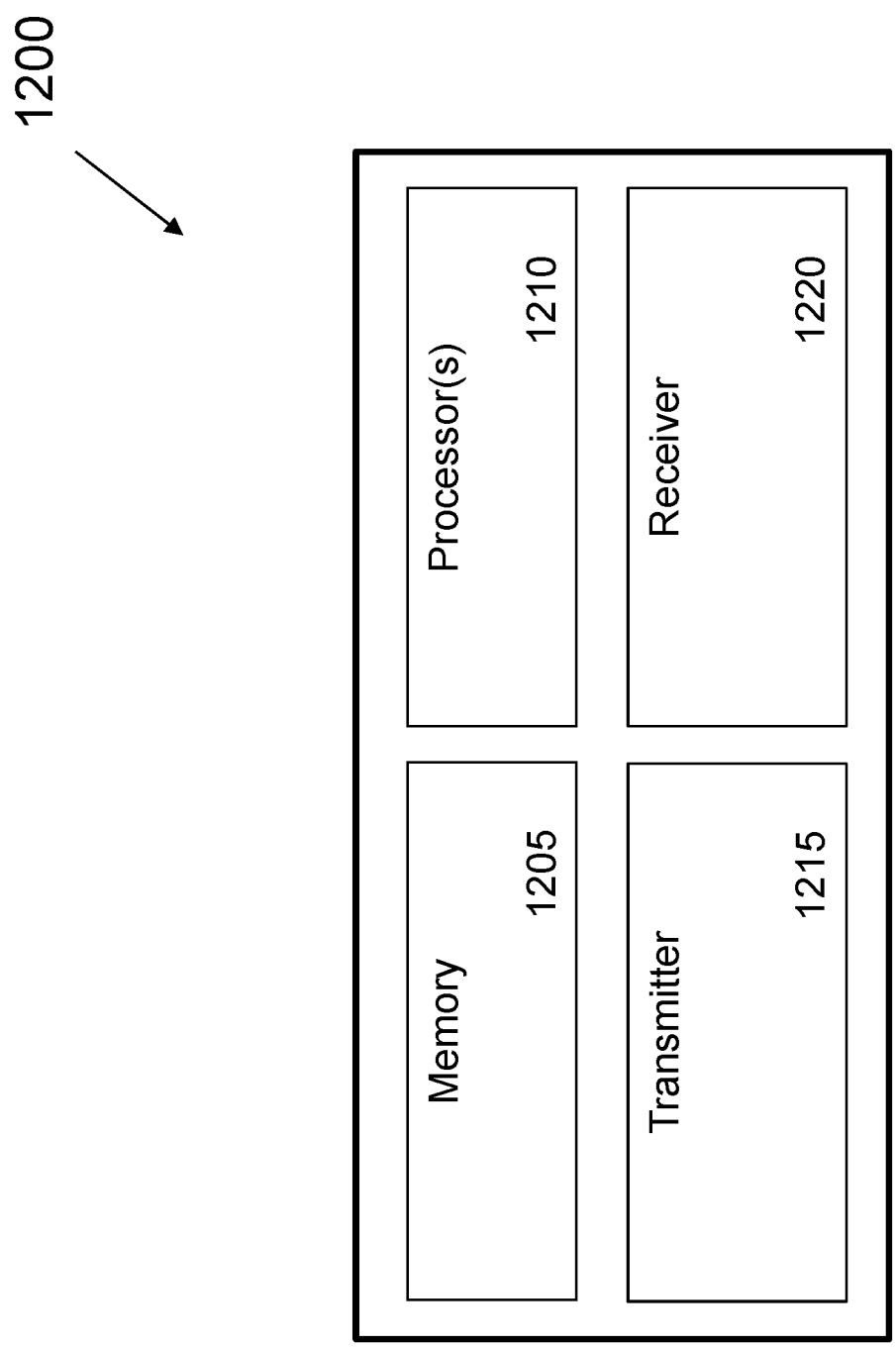
FIG. 12 shows an exemplary block diagram of a hardware platform that may be a part of a network node or a communication node.

FIG. 12 shows an exemplary block diagram of a hardware platform 1200 that may be a part of a network node (or base station) or a communication node (or a UE). The hardware platform 1200 includes at least one processor 1210 and a memory 1205 having instructions stored thereupon. The instructions upon execution by the processor 1210 configure the hardware platform 1200 to perform the operations described in FIGS. 2 to 11 and in the various embodiments described in this patent document. The transmitter 1215 transmits or sends information or data to another node. For example, a network node transmitter can send one or more black cell list and/or one or more neighbor cell list via SIB or RRC signaling to a communication node. The receiver 1220 receives information or data transmitted or sent by another node. For example, a communication node can receive the one or more black cell list and/or one or more neighbor cell list.

This patent document describes several techniques to improve cell reselection technology. In a first example technique, a network node can transmit a black cell list, where the black cell list can be configured or transmitted in a SIB or a dedicated RRC signaling, where one network node can provide a type of service as a type of network that can include PNI-NPN or SNPN or NPN, where the black cell list can be configured or transmitted for each network ID or type of network, and/or where the black cell list can be configured for the intra frequency or inter frequencies.

In a second example technique, a network node can transmit a neighbor cell list, where the neighbor cell list can be configured or transmitted in a SIB or a dedicated RRC signaling, where one network node can provide a type of service as a type of network that can include PNI-NPN or SNPN or NPN, where the neighbor cell list can be configured or transmitted for each network ID or type of network, and/or where the neighbor cell list can be configured for the intra frequency or inter frequencies.

In a third example technique, a UE can receive the black cell list and can perform cell reselection process by excluding the black listed cells that under the concerned network types/network IDs from the candidate list for cell reselection. In a fourth example technique, a UE can receive the neighbor cell list and can perform a cell reselection process by taking the neighbor cell list under the concerned network types/network IDs into consideration for cell reselection.

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method, comprising:
receiving, by a communication node from a network node, a plurality of black cell lists or a plurality of neighbor cell lists,
wherein each black cell list describes a range of physical cell identifiers (PCI) of one or more network nodes that are prevented from being used by the communication node,
wherein each black cell list is associated with one or more network identifiers (IDs) of the one or more network nodes,
wherein each black cell list is further associated with an indication of a type of network that indicates a type of service provided by one network node when the network node is configured to provide a type of service other than or in addition to a public network service,
wherein each neighbor cell list describes one or more physical cell identifiers (PCIs) of one or more network nodes that are allowed to be utilized by the communication node,
wherein each neighbor cell list is associated with one or more network identifiers (IDs) of the one or more network nodes, and
wherein each neighbor cell list is further associated with an indication of a type of network that indicates a type of service provided by one network node when the network node is configured to provide a type of service other than or in addition to a public network service; and
performing a cell reselection process by using a black cell list from the plurality of black cell lists or by using a neighbor cell list from the plurality of neighbor cell lists according to a rule in which an attribute of the black cell list or of the neighbor cell list matches an attribute of the network node to which the communication node is configured to communicate.

2. The method of claim 1, wherein the rule specifies that the black cell list or the neighbor cell list is associated with a network ID attribute that is same as that of the network node to which the communication node is configured to communicate.

3. The method of claim 1, wherein the rule specifies that the black cell list or the neighbor cell list is associated with an indication of a type of network attribute that is same as that of the network node to which the communication node is configured to communicate.

4. The method of claim 1, wherein the plurality of black cell lists or the plurality of neighbor cell lists are received in a system information block (SIB).

5. The method of claim 1, wherein the plurality of black cell lists or the plurality of neighbor cell lists are received in a radio resource control (RRC) signaling.

6. The method of claim 1, wherein the type of network includes a public network integrated non-public network (PNI-NPN), a stand-alone non-public network (SNPN), or a non-public network (NPN).

7. The method of claim 1, wherein the plurality of black cell lists or the plurality of neighbor cell lists are configured for intra frequency of the network node or for each inter-frequency of the network node.

8. A communication node for wireless communication, comprising:
a processor configured to implement a method, the processor configured to:
receive, from a network node, a plurality of black cell lists or a plurality of neighbor cell lists,
wherein each black cell list describes a range of physical cell identifiers (PCI) of one or more network nodes that are prevented from being used by the communication node,
wherein each black cell list is associated with one or more network identifiers (IDs) of the one or more network nodes,
wherein each black cell list is further associated with an indication of a type of network that indicates a type of service provided by one network node when the network node is configured to provide a type of service other than or in addition to a public network service,
wherein each neighbor cell list describes one or more physical cell identifiers (PCIs) of one or more network nodes that are allowed to be utilized by the communication node,
wherein each neighbor cell list is associated with one or more network identifiers (IDs) of the one or more network nodes, and
wherein each neighbor cell list is further associated with an indication of a type of network that indicates a type of service provided by one network node when the network node is configured to provide a type of service other than or in addition to a public network service; and
perform a cell reselection process by using a black cell list from the plurality of black cell lists or by using a neighbor cell list from the plurality of neighbor cell lists according to a rule in which an attribute of the black cell list or of the neighbor cell list matches an attribute of the network node to which the communication node is configured to communicate.

9. The communication node of claim 8, wherein the rule specifies that the black cell list or the neighbor cell list is associated with a network ID attribute that is same as that of the network node to which the communication node is configured to communicate.

10. The communication node of claim 8, wherein the rule specifies that the black cell list or the neighbor cell list is associated with an indication of a type of network attribute that is same as that of the network node to which the communication node is configured to communicate.

11. The communication node of claim 8, wherein the plurality of black cell lists or the plurality of neighbor cell lists are received in a system information block (SIB).

12. The communication node of claim 8, wherein the plurality of black cell lists or the plurality of neighbor cell lists are received in a radio resource control (RRC) signaling.

13. The communication node of claim 8, wherein the type of network includes a public network integrated non-public network (PNI-NPN), a stand-alone non-public network (SNPN), or a non-public network (NPN).

14. The communication node of claim 8, wherein the plurality of black cell lists or the plurality of neighbor cell lists are configured for intra frequency of the network node or for each inter-frequency of the network node.

\* \* \* \* \*